United States Patent [19]

Iwamoto et al.

[11] Patent Number: 5,730,251
[45] Date of Patent: Mar. 24, 1998

[54] HYDRAULIC SYSTEM FOR SERVING FOOD

[76] Inventors: Yukio Iwamoto; Masako Iwamoto, both of 1 James Ave., Atherton, Calif. 94027

[21] Appl. No.: 530,769

[22] Filed: Sep. 19, 1995

Related U.S. Application Data

[63] Continuation-in-part of Ser. No. 466,666, Jun. 6, 1995, Pat. No. 5,566,782, which is a continuation of Ser. No. 149,687, Nov. 9, 1993, Pat. No. 5,474,153.

[51] Int. Cl.⁶ .................................................. B65G 53/02
[52] U.S. Cl. ............................................ 186/49; 114/219
[58] Field of Search .......................... 186/38, 49; 104/59, 104/73; 273/140; 472/13; 114/219

[56] References Cited

U.S. PATENT DOCUMENTS

| | | | |
|---|---|---|---|
| 766,532 | 8/1904 | Schmitt | 114/219 X |
| 1,294,081 | 2/1919 | Gasiorowski | 114/219 |
| 4,840,253 | 6/1989 | DiMaggio et al. | 186/49 |

*Primary Examiner*—F. J. Bartuska
*Attorney, Agent, or Firm*—Townsend and Townsend and Crew LLP

[57] ABSTRACT

An apparatus (50) for serving and displaying food including a continuous watercourse (54). Patrons sit around a periphery of the watercourse. Food carriers (58) circulate in the watercourse and carry various food trays. The food carriers are structurally independent from one another so that each food carriers is independently removable from the said watercourse. The apparatus further includes structurally independent spacer members (60) positioned between the food carriers along the watercourse. The spacer members are sized to maintain a predetermined spacing between the food carriers in the watercourse.

11 Claims, 4 Drawing Sheets

5,730,251

1

HYDRAULIC SYSTEM FOR SERVING FOOD

The present invention is a continuation-in-part of application Ser. No. 08/466,666, filed on Jun. 6, 1995, now U.S. Pat. No. 5,566,782 which was a continuation of application Ser. No. 08/149,687, filed on Nov. 9, 1993, now U.S. Pat. No. 5,474,153, the full disclosures of which are incorporated herein by reference.

FIELD OF THE INVENTION

BACKGROUND OF THE INVENTION

The present invention relates to the field of food delivery and service devices. More specifically, the present invention relates to a method and apparatus for continuously serving and displaying food.

The concept of displaying food along a circular path of travel before a group of patrons has enjoyed success in Japanese restaurants which serve sushi. In the traditional method of serving sushi the patrons sit in front of the sushi chef and order sushi. A single sushi order is quite small and a single meal generally comprises a number of individual orders which requires a number of interactions between the patron and the sushi chef. The large number of transactions between the sushi chef and each patron limits the number of patrons a sushi chef can serve. Furthermore, making sushi is a relatively involved process. Thus, in the traditional method of serving sushi the patron can wait quite a long time before being served.

With the introduction of automatic food display and service systems a sushi chef can serve a greater number of patrons while providing fresh sushi to the patron as soon as the patron is seated. One such food display system is disclosed in U.S. Pat. No. 4,450,032 to Imanaka. Imanaka discloses a continuous chain of small food carriers having the shape of boats arranged in a watercourse. The bow of each boat is physically attached to the stern of an adjacent boat via a chain or other interconnecting member. Food orders are placed on the boats which are circulated around the watercourse via a water current. Patrons seated around the watercourse remove the food orders from the boats as they pass by. A wide variety of sushi is placed on the boats for presentation to the patrons. The chef monitors and replenishes empty boats with the appropriate variety of sushi. In this manner the sushi chef can serve a greater number of patrons while continually presenting a wide variety of sushi to the patrons.

As can be appreciated, the device of Imanaka suffers from the disadvantage that the boats are connected together. Thus, removal of a single boat for repair or other reasons requires that the boat be severed from the continuous chain. Such a removal requires disabling the entire system. Disabling the system is obviously troublesome since the sushi cannot be served to the patrons during this time.

A further problem with Imanaka occurs when the watercourse must be cleaned. When preparing and serving sushi very sterile conditions are required due to the nature of the food. The food delivery system of Imanaka requires that each boat be disconnected from the line or, alternatively, all boats are removed at once to clean the watercourse. Either procedure can be quite time consuming.

SUMMARY OF THE INVENTION

The food service and delivery system of the present invention includes food carriers which are structurally independent from one another so that each food carrier is independently removable from the watercourse for repair or any other reason.

The food carriers include a means for maintaining a predetermined spacing between the food carriers in the watercourse. The predetermined spacing gives the patron adequate time to select sushi from adjacent food carriers and also gives the sushi chef adequate time to add sushi to adjacent food carriers.

In a specific configuration, the maintaining means is a plurality of buoyant spacer members floating in the continuous watercourse between the food carriers under the influence of the current. Each spacer member is a disc sized to maintain a predetermined spacing between adjacent food carriers. Preferably, the predetermined spacing is at least one quarter the length of the waterline of the food carriers.

In one configuration, the food carriers are boats having a sloped bow and a stern. In this configuration, the spacer members may comprise a pair of horizontally spaced, elongate extensions sized to receive a bow of the boat. The extensions maintain the alignment of the boats in the waterway and help to minimize contact between the boats and the watercourse walls.

Other features and advantages of the invention will appear from the following description in which the preferred embodiments have been set forth in detail in conjunction with the accompanying drawings.

DESCRIPTION OF THE PREFERRED EMBODIMENT

Figure 1:
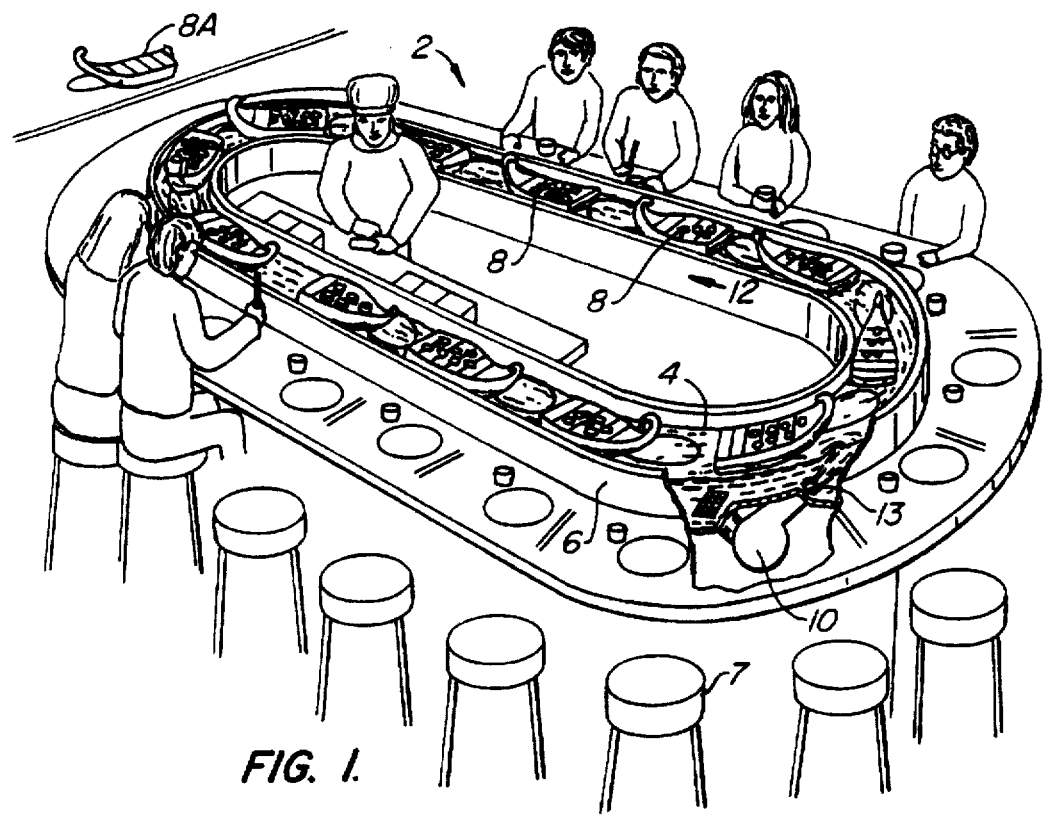
FIG. 1 shows a food display and service system including a watercourse and a number of individual, unconnected food carriers.

A food display and delivery system 2 is shown in FIG. 1. A continuous watercourse 4 has an outer periphery 6 about which seats 7 are positioned for seating patrons. A number of food carriers 8 in the form of boats float on the watercourse 4. A pump 10 induces a current in the watercourse in the direction of arrow 12. The inlet 11 and outlet 13 of the pump 10 are fluidly coupled to the watercourse and are configured to induce the current.

The patrons observe the food carriers 8 as they float by and select the various foods presented on them. After the food on a food carrier has been removed, a food preparer adds an appropriate type of food depending upon the current variety available on the other food carriers. The food carriers may optionally include an indication of what type of food the food carrier carries so that the preparer does not have to monitor all of the food carriers. The indicators help the food preparer maintain a wide variety of the food.

The food carriers 8 are unconnected and, therefore, can be removed individually from the watercourse 4. Thus, an individual food carrier 8 may be removed for repair without interrupting the circulation of the other food carriers. A stand-by food carrier 8A may be added to the watercourse to replace the removed food carrier. The unconnected food carriers also facilitate cleaning the watercourse since the food carriers can be removed quickly without having to disconnect the food carriers from one another or without having to remove all of the food carriers at the same time.

The unconnected food carriers also advantageously permit selecting the appropriate number of food carriers at a given time. When sushi is served, for example, it is desired to provide a fresh product. Thus, it is undesirable to have the same food on the food carrier for an extended period of time. In order to turn the food over in a short period of time, the number of food carriers in the watercourse can be increased or decreased depending on the number of portions. The unconnected carriers permit a quick change in the number of food carriers. Thus, when a great number of patrons are being served a greater number of food carriers can be introduced into the watercourse. Conversely, when a small number of patrons are being served a lower number of food carriers may be provided.

Figure 2:
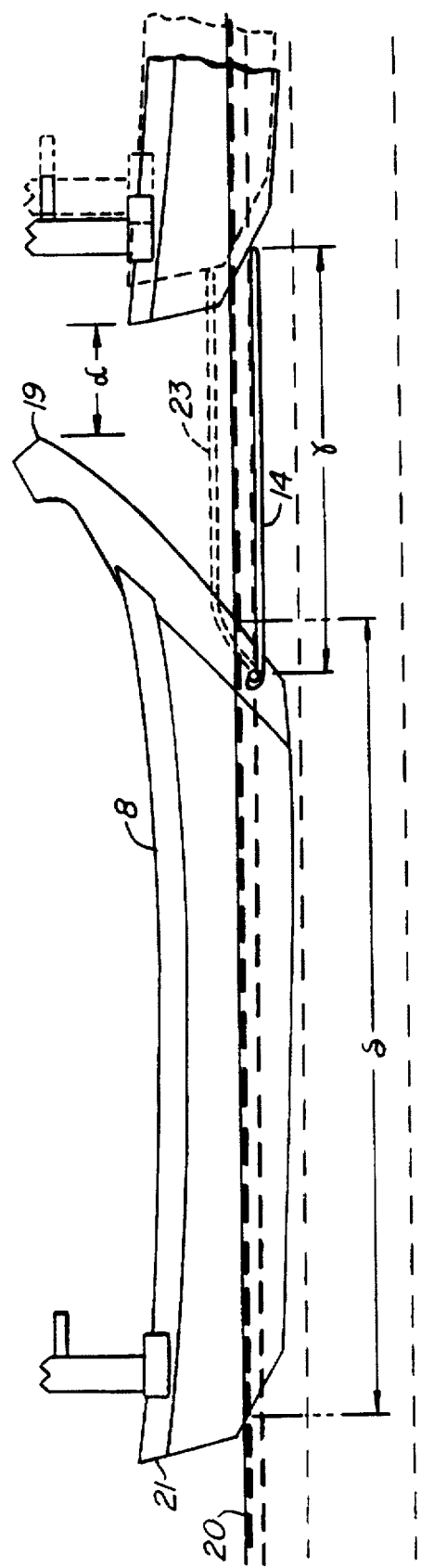
FIG. 2 is a side view of a food carrier in the watercourse.

The food carrier has a bumper 14 which maintains a predetermined minimum spacing 16 between the food carriers 8 (FIG. 2). The predetermined spacing 16 gives the patrons time to select food from adjacent food carriers 8 and also gives the food preparer time to add food to adjacent carriers. The bumper 14 also prevents the food carriers from contacting one another.

Figure 3:
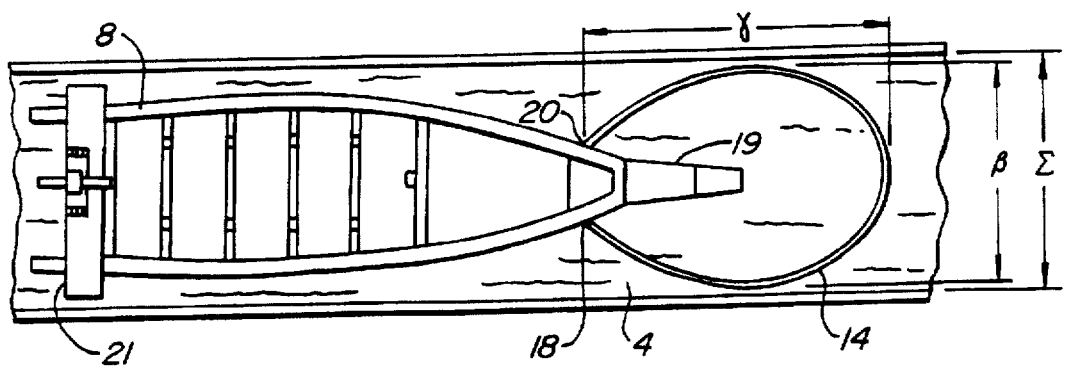
FIG. 3 is a plan view of the food carrier of FIG. 2.

The bumper 14 is preferably a wire loop connected to the food carrier at first and second ends 18, 20 to form a closed loop (FIG. 3). When the food carrier is in the form of a boat, it is preferable to connect the bumper to a stern 19 rather than a bow 21 of the boat. The bumper may take many forms, for example, a rigid T-shaped member, or a loop in the shape of a square or triangle. The bumper is designed so as not to distract from the overall aesthetic appeal of the system.

The bumper 14 is also preferably substantially positioned below a free surface 20 of the watercourse. By positioning the bumper below the free surface the aesthetic appearance of the system is not compromised. The bumper 14 may, of course, also be positioned above the free surface of the watercourse as depicted in broken lines 23 in FIG. 2.

The bumper has a width 22 which is substantially equal to the width 24 of the watercourse 4 so that the bumper 14 helps to keep the food carrier aligned with the watercourse 4. The bumper also minimizes contact between the food carrier and a watercourse wall 26 thereby reducing wear and tear on the food carriers.

The bumper has a relatively long length 28 as compared to the overall length of the food carrier. The food carrier has a length of the water line 30 as shown in FIG. 2. The length of the bumper 28 is preferably at least one quarter the length of the water line 30 and more preferably at least one third the length of the water line 30.

Figure 4:
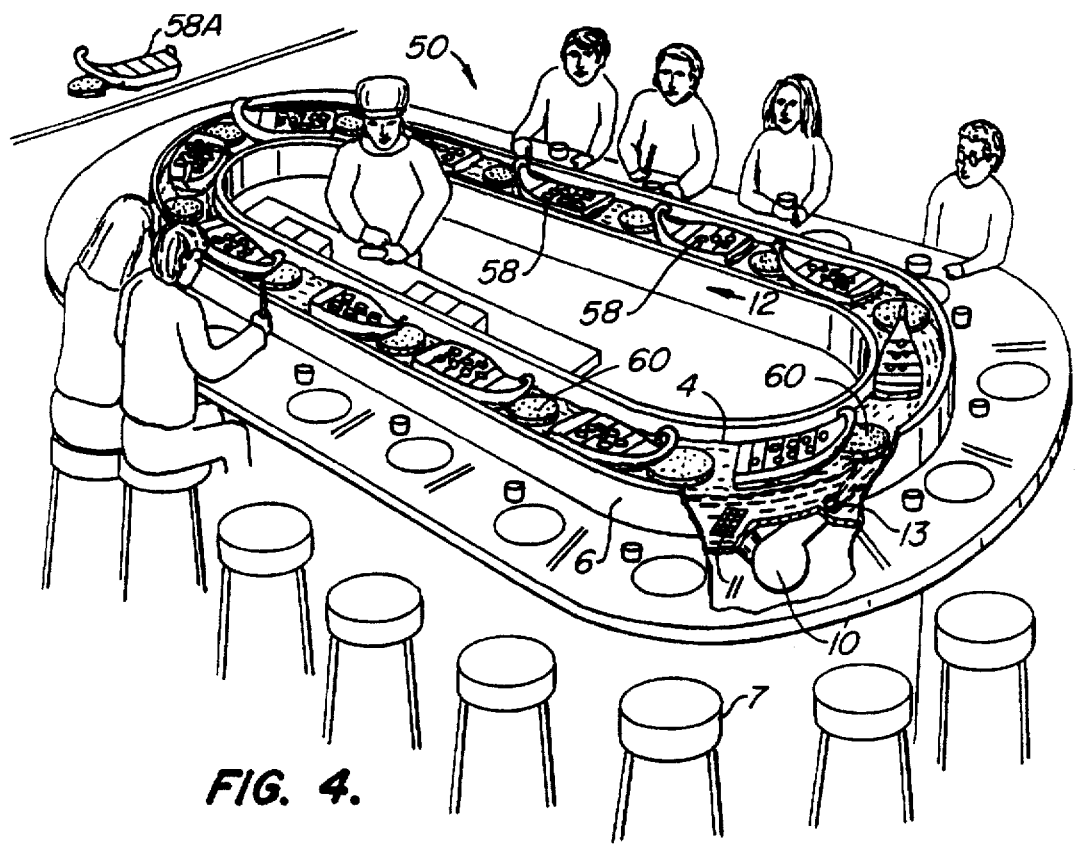
FIG. 4 illustrates another food display and service system including a plurality of spacer members positioned between a number of individual, unconnected food carriers.
Figure 6:
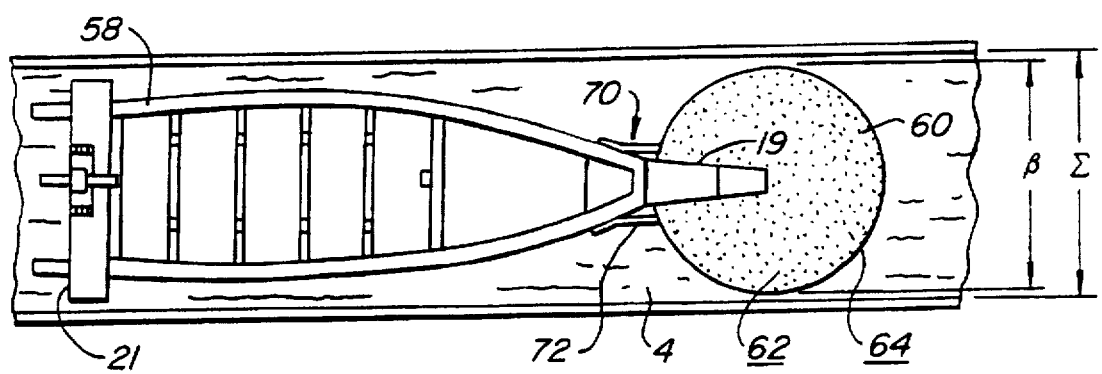
FIG. 6 is a plan view of one of the food carriers and the spacer member of FIG. 5.
Figure 5:
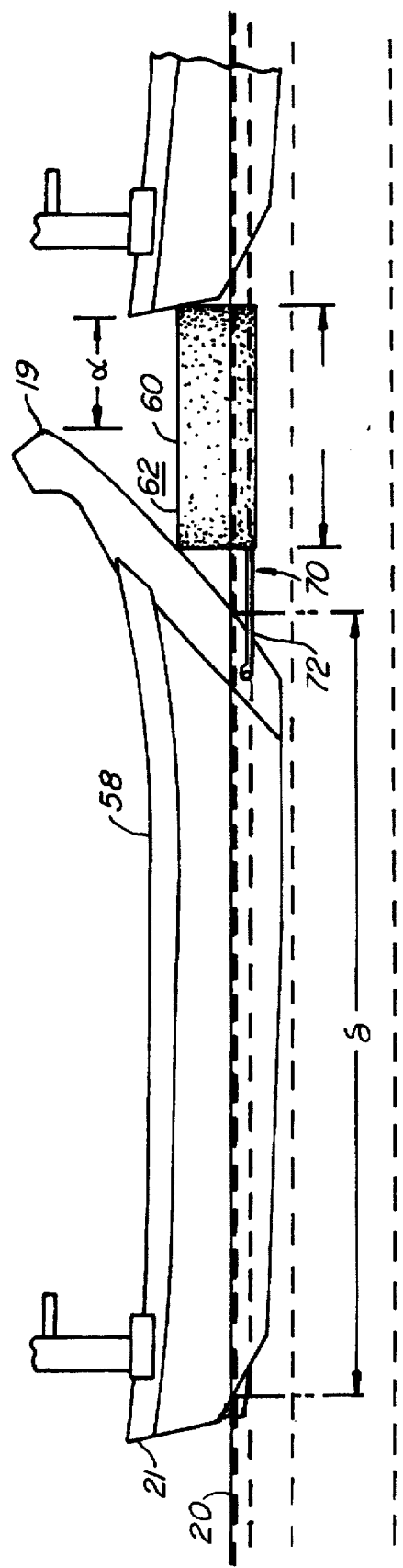
FIG. 5 is a side view of two adjacent food carriers and one of the spacer members of FIG. 4.

FIGS. 4–6 illustrate another food display and delivery system 50 of the present invention. As in the previous embodiment, system 50 includes a continuous watercourse 54 with a number of food carriers 58 in the form of boats floating on watercourse 54 in the direction of the current 12. It should be noted that food carriers 58 do not have bumpers 14 (FIGS. 1–3) attached thereto in this embodiment. Rather, system 50 further includes a number of spacer members 60 floating between adjacent food carriers 58 with the current. Spacer members 60 function to maintain the predetermined minimum spacing α between food carriers 58.

As shown in FIGS. 5 and 6, each spacer member 60 preferably comprises a disk having a substantially planar upper surface 62 and a circular side surface 64 for abutting against the bow and the stern of two adjacent food carriers 58. Spacer member 60 preferably has a diameter at least one quarter the length of the water line δ and more preferably at least one third the length of the water line δ. The relatively large diameter of spacer member 60 facilitates maintaining the alignment of food carriers 58 with the watercourse. In addition, spacer member 60 minimize contact between the food carrier and the water wall 26 to reduce wear and tear on the food carriers.

Spacer member 60 preferably comprises a suitable buoyant material, such as cork, bamboo, wood, etc. so that member 60 will float along watercourse 54. Alternatively, spacer member 60 may comprise a less buoyant material, such as metal, with a hollow interior so that the weight of member 60 is less than the weight of an equivalent volume of water. As shown in FIG. 5, the preferred embodiment of food carrier 58, i.e. a boat, has a generally sloping bow 19. Accordingly, spacer member 60 will have a height above the water line sufficient to maintain a space α between adjacent food carriers 58. Preferably, space α is at least one eighth the length of the water line. Of course, the height above the water line of spacer member 60 will depend mainly on the thickness and buoyancy of spacer member 60.

In a preferred embodiment, spacer member 60 further comprises holding means for maintaining the alignment of food carrier 58 with the water course. As shown in FIGS. 5 and 6, holder 70 comprises a pair of elongate members 72 extending from side surface 64 of member 68. Elongate members 72 are horizontally spaced from each other by a distance sufficient to define a gap therebetween for receiving the bow 19 of food carrier 58. Bow 19 is held near the central portion of the watercourse by elongate members 72. Elongate members 72 can be constructed of a variety of materials, such as metal wire, bamboo, wood, etc.

Modification and variation can be made to the disclosed embodiments without departing from the subject of the invention as defined by the following claims. For example, size and shape of the spacer members may vary, the predetermined distance formed by the spacer members may vary, and the food carriers may take the form of a raft-like structure rather than a boat.

What is claimed is:

1. An apparatus for serving and displaying food comprising:

a continuous watercourse having a watercourse width and an outer periphery, the continuous watercourse containing water having a free surface;

a pump for inducing current in the continuous watercourse;

a plurality of food carriers floating in the continuous watercourse under the influence of said current, said food carriers being structurally independent from one another so that each food carriers is independently removable from said watercourse; and a plurality of spacer members positioned between said food carriers and not attached to said food carriers, the spacer members being sized to maintain a predetermined spacing between said food carriers in said watercourse.

2. The apparatus for serving and displaying food of claim 1 wherein the food carriers have a length of the water line when positioned in the water and the spacer members have a length in the direction of current equal to at least one quarter the length of the water line of the food carrier.

3. The apparatus for serving and displaying food of claim 1 wherein the spacer members are structurally independent from the food carriers.

4. The apparatus for serving and displaying food of claim 1 wherein the spacer members have a width substantially equal to the watercourse width so that the food carrier maintains alignment with said watercourse.

5. The apparatus for serving and displaying food of claim 1 wherein the spacer members each comprise a disk having a diameter and a height selected to separate the food carriers by a distance of at least one eighth the length of the water line.

6. The apparatus for serving and displaying food of claim 1 wherein a substantial portion of the spacer members are positioned above the free surface of the watercourse.

7. The apparatus for serving and displaying food of claim 1 wherein the spacer members comprise means for maintaining alignment of the food carriers within the watercourse.

8. The apparatus for serving and displaying food of claim 7 wherein the food carriers comprise boats having a bow and a stern, each maintaining means comprising a pair of horizontally spaced elongate members extending from each spacer member and defining a gap therebetween for receiving the bow of the boat.

9. An apparatus for serving and displaying food comprising:

- a continuous watercourse having a watercourse width and an outer periphery, the continuous watercourse containing water having a free surface;
- a pump for inducing current in the continuous watercourse;
- a plurality of food carriers floating in the continuous watercourse under the influence of said current, said food carriers having a length of the water line and being structurally independent from one another so that each food carriers is independently removable from said watercourse; and
- means for maintaining a predetermined spacing between said food carriers in said watercourse;
- wherein said spacer means comprise spacer members each having a disk with a diameter and a height selected to separate the food carriers by a distance of at least one eighth a length of the water line.

10. An apparatus for serving and displaying food comprising:

- a continuous watercourse having a watercourse width and an outer periphery, the continuous watercourse containing water having a free surface;
- means for inducing a current in the continuous watercourse;
- a plurality of food carriers floating in the continuous watercourse under the influence of said current, said food carriers being structurally independent from one another so that each food carrier is independently removable from said watercourse, said food carriers each having a length of the water line when floating in the watercourse; and
- a plurality of spacer members positioned between said food carriers and sized to maintain a predetermined spacing between said food carriers in said watercourse, the spacer members having a length in the direction of current equal to at least one-quarter the length of the waterline;
- wherein said spacer members each comprise a disk comprising a generally buoyant material such that the disk floats along the watercourse between adjacent food carriers.

11. The apparatus for serving and displaying food of claim 10 wherein the disk members each have a diameter and a height selected to separate the food carriers by a distance of at least one eighth the length of the water line.

* * * * *